Nov. 23, 1971    P. J. HOOPER    3,621,819
COW WALKER
Filed July 2, 1970    3 Sheets-Sheet 1
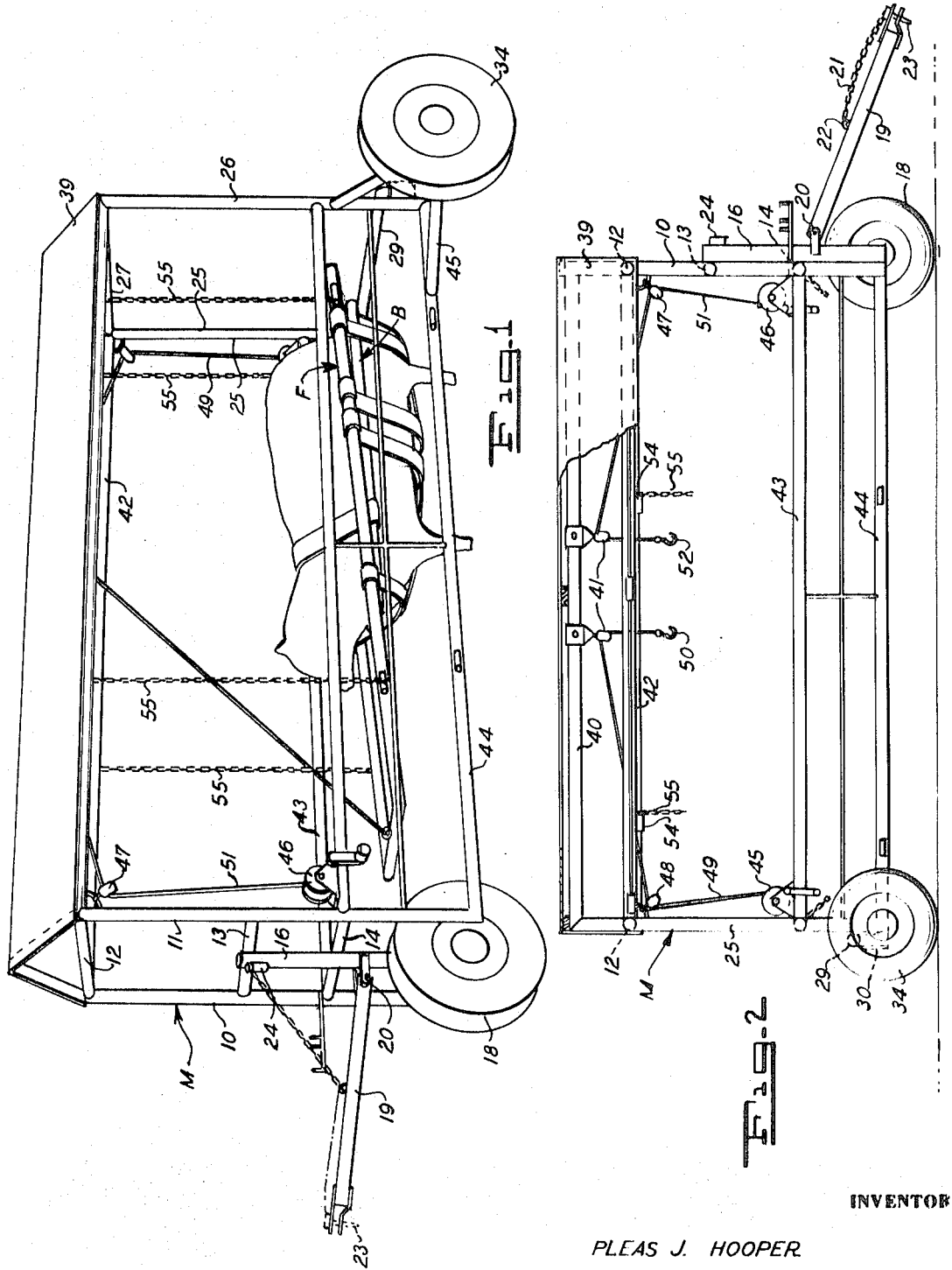
INVENTOR
PLEAS J. HOOPER
BY Kimmel, Crowell & Weaver
ATTORNEYS

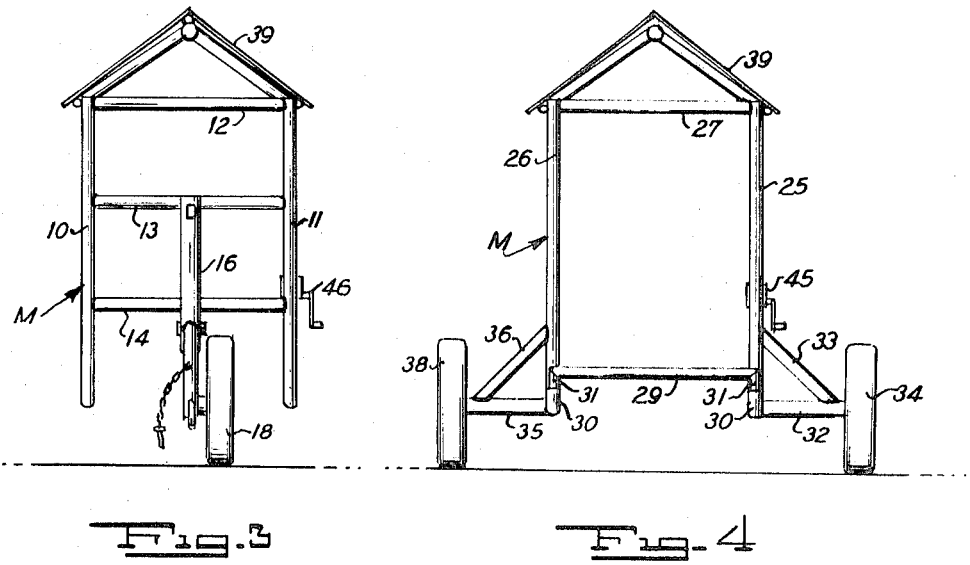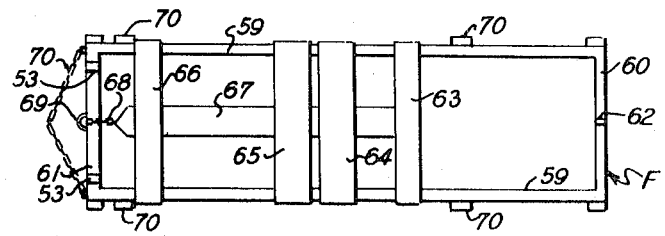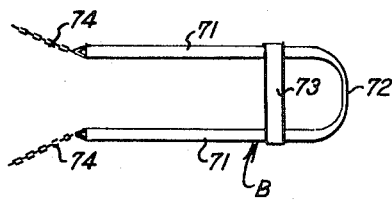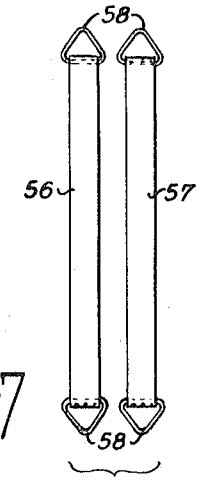

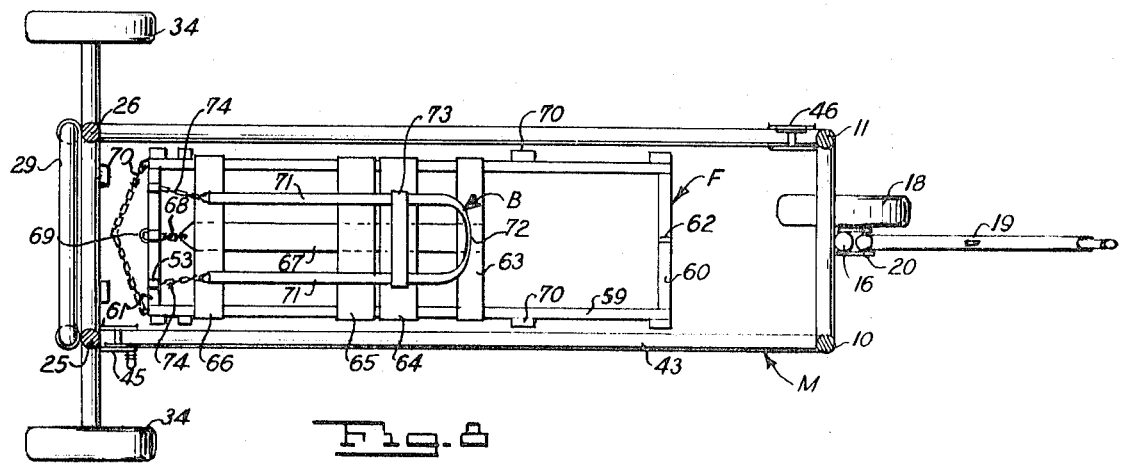
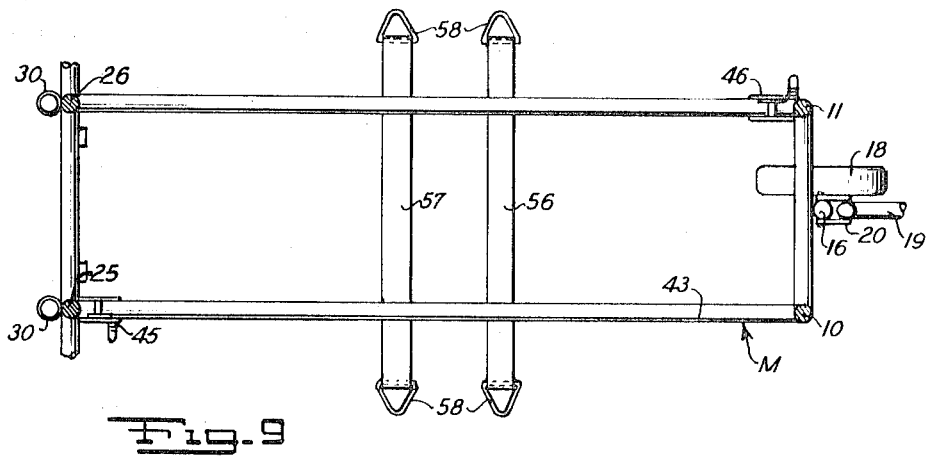
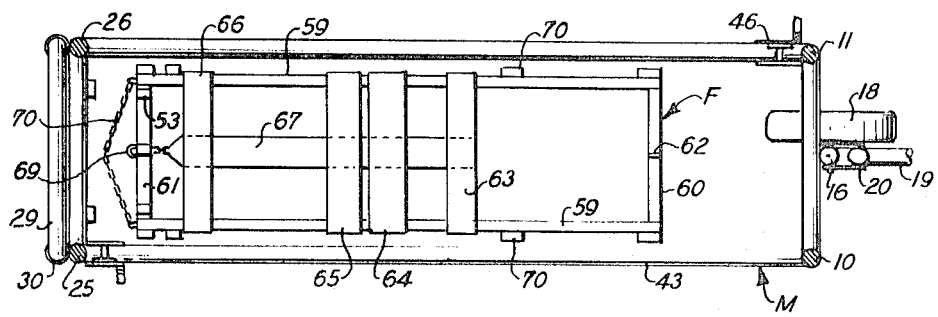

United States Patent Office 3,621,819
Patented Nov. 23, 1971

3,621,819
COW WALKER
Pleas J. Hooper, Rte. 2, Hastings, Okla. 73548
Filed July 2, 1970, Ser. No. 51,811
Int. Cl. A61d 3/00
U.S. Cl. 119—102
10 Claims

ABSTRACT OF THE DISCLOSURE

This specification discloses apparatus for hoisting a cow, which is incapacitated because of calving, into an erect position, and which offers support as the cow walks about on her way to recovery. The apparatus consists essentially of a mobile frame, a pair of winches at the opposite ends of the frame, a cable taken up on each winch and passing over pulleys supported from the frame top with a hook at the free end of each cable. A pair of belly straps are positioned under the cow after the frame is located above her and the hooks are secured to loops at the end of the straps whereupon operation of the winches raises the cow to an erect position.

A stretcher like frame is then positioned beneath the cow and the hooks are removed from the belly strap and secured to the opposite ends of the stretcher frame. A breast harness is then mounted over the head end of the cow and secured to the rear end of the mobile frame.

---

This invention relates to a cow walker and is concerned primarily with apparatus which is susceptible of operation to raise a cow to an erect position, and after certain adjustments are made therein supports the cow as she gradually regains her ability to walk about in a normal manner.

BACKGROUND OF THE INVENTION

After a cow delivers a calf her hind legs are often paralyzed to a degree which prevents her from rising from a prone position under her own power and also partially impairs her ability to walk. It is not sufficient to merely assist the cow in assuming an erect position, because, in attempting to walk she will often falter and exhibit a tendency to fall to the ground. It is also desirable that she be given the opportunity to walk while unsupported.

While there are known devices for holding an animal in an erect position these have been provided for the purpose of performing some operation thereon. None of the known devices is susceptible of operation to first elevate a cow to an erect position and which may then be adjusted to offer support to the cow as she walks about until her walking ability is fully restored.

OBJECTS OF THE INVENTION

With the foregoing condition in mind, the invention has in view the following objects:

(1) To provide apparatus including a mobile frame which may be moved into a position over a cow lying prone on the ground, and, after certain adjustments be operated to raise the cow to an erect position.

(2) To provide apparatus of the type aforesaid which includes a stretcher-like frame which is attached to the mobile frame and which offers support to the cow should she falter in her attempt to walk.

(3) To provide, in apparatus of the character noted, a breast harness which is applied to the cow and secured to the mobile frame so that the latter is moved as the cow walks.

(4) To provide, in apparatus of the kind described, a mobile frame including a hitch that is available to draw the frame to a desired location and which may be lifted to an out of the way position after a cow is properly secured so as not to interfere with the cow's walking.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objects are achieved by providing a cow walker which includes, as a characteristic and essential element, an open frame of generally rectangular shape and rendered mobile by a pair of rear wheels and a pivoting front wheel. A hitch is secured to the post on which the front wheel is mounted.

Front and rear winches are mounted on the frame and a cable is taken up on each winch. Each cable passes over a pair of pulleys mounted on the top structure of the frame and carries a hook at its free end. In the initial operation of raising a cow to an elevated position these hooks are connected to loops at the ends of belly straps that are positioned beneath the cow in its prone position.

A stretcher-like frame of rectangular shape presenting front and rear bars is disposed about the cow after she has been erected. This stretcher frame includes four cross straps that are located beneath the cow traversely and two of which are in a slack condition when the cow walks. The hooks are removed from the belly strap loops and secured to the front and rear bars whereupon the winches are operated to lift the stretcher frame to a desired height. Chains suspended from the top structure of the mobile frame are secured to the side bars of the stretcher frame and hold it in a raised position prior to the engagement of the hooks therewith.

A U-shaped breast harness is now applied over the front end of the cow and the legs of the U secured to a rear cross bar of the mobile frame. Provision is made for holding the hitch to an elevated position in which it will not interfere with the cow walking.

For a full and more complete understanding of the invention reference may be had to the following description and accompanying drawings wherein:

FIG. 1 is a perspective of the cow walker of this invention with a cow supported thereby for walking.

FIG. 2 is a side view, mainly in elevation, of the mobile frame before the first step of its usage.

FIG. 3 is a front elevation of the forward part of the mobile frame.

FIG. 4 is a rear elevation of the rear part of the mobile frame.

FIG. 5 is a top plan view of the stretcher frame per se.

FIG. 6 is a top plan of the breast harness per se.

FIG. 7 is a plan view of the two belly straps as straightened out before use.

FIG. 8 is a top plan view of the stretcher frame, and breast harness as positioned on the mobile frame with the cow omitted. This view might be considered as a horizontal section through the mobile frame as uprights of the latter are shown in section.

FIG. 9 is a plan view of the two belly straps as stretched out beneath the mobile frame with only parts of the latter being shown.

FIG. 10 is a plan view somewhat similar to FIG. 8 but with the breast harness omitted.

Referring now to the drawings, wherein like reference characters denote corresponding parts, the various elements of the apparatus will first be described and then the mode of operation.

A mobile frame is illustrated in its entirety in FIGS. 1 and 2 and portions thereof in FIGS. 3, 4, 8, 9 and 10. It is identified generally by the reference character M. Frame M includes a front end structure comprising uprights 10 and 11, a top cross bar 12, an intermediate cross bar 13, and a lower cross bar 14. Secured to cross bars 13 and 14 substantially at their centers is a vertical pivot column 16 in which a shaft (not illustrated) is received. Mounted on the lower end of this shaft is a wheel 18. A hitch 19 is pivotally connected to column 16 at 20. A chain 21 has one end anchored to hitch 19 at 22 and its free end carries a pin 23 which is adapted for cooperation with a complemental element on a draft vehicle to secure the hitch thereto. Pin 23 is also adapted for reception in a socket 24 to secure hitch 19 in an upraised position as illustrated in FIG. 1.

Frame M also includes a rear end structure that is best shown in FIG. 4. It comprises vertical uprights 25 and 26, a top cross bar 27, and a removable lower cross bar 29. This removability is provided by sockets 30 (FIGS. 4 and 9) mounted on the lower ends of uprights 25 and 26 and which receive downturned end portions 31 on bar 29.

Outstanding from the lower end of upright 25 is an axle 32, supported by diagonal brace 33 and carrying a wheel 34 at its free end. Similarly an axle 35 extends from the lower end of upright 26, is supported by a brace 36 and carries a wheel 38 at its free end.

A roof or top structure of V cross section extends between the upper ends of the front end and rear end structures. This roof is designated 39. This roof structure includes a longitudinal center beam 40 (FIG. 2). Suspended from this beam are two pulleys 41 located centrally of the frame M.

The front and rear end structures are connected by upper side beams 42, intermediate side beams 43 and lower side beams 44. Diagonal braces 45 (FIG. 1) support axles 32 and 35 from the side beams 44.

Mounted on one side beam adjacent to upright 25 is a winch 45 (FIG. 2) having an operating handle while another winch 46 (FIG. 1) is mounted on the other beam 43 adjacent to upright 11. A pulley 47 is suspended from the corner where upright 11 joins one of the upper side beams 42 while another pulley 48 is suspended from the corner where the other side beam 42 joins upright 25 (FIG. 2). A cable 49 is taken up on winch 45, passes over pulley 48 and one of the pulleys 41 and carries a hook 50 at its free end. Similarly, another cable 51 is taken up on winch 46, passes over pulley 47 and the other pulley 41 and has a hook 52 at its free end.

Each of the upper side beams 42 is provided with a pair of anchors 54 for chains 55 the purpose of which will later appear.

A pair of belly straps 56 and 57 are shown alone in FIG. 7 and in relation to frame M in a stretched out condition in FIG. 9. Each of these straps 56 and 57 carries a loop 58 at each end thereof. The straps are of sufficient length to encompass the body of a cow with loops 58 on each strap meeting at a point above the cow's body.

A stretcher-like frame is shown in detail in FIG. 5 and referred to generally at F. It is shown in relation to mobile frame M in FIG. 10 and as further combined with a breast harness in FIG. 8. Frame F comprises a pair of side bars 59, a front bar 60 and a rear bar 61. Bar 61 is formed with a pair of slots 53. Midway of front bar 60 is a loop 62. Extending between side bars 59 are: a front cross strap 63, intermediate cross straps 64 and 65 and a rear cross strap 66. A longitudinal center strap 67 has one end secured to cross strap 63 and its other end to rear bar 61 by a chain 68 passing through a loop 69.

A chain 70 is provided for manipulation purposes and its ends are secured to the opposite ends of rear bar 61. Each of the side bars 59 is provided with a pair of chain anchors in the form of tabs 70 which may be provided with apertures (not illustrated).

A breast harness is shown per se in FIG. 6 and designated generally B. It is also illustrated in relation to frame F in FIG. 8. Harness B comprises a U-shaped strap presenting side legs 71 joined by a front bend portion 72. Extending between legs 71 adjacent to bend 72 is a top strap 73 which has sufficient slack to enable it to be positioned over the top of a cow just behind the neck as shown in FIG. 1. Extending from the free end of each leg 71 is a chain 74 having an anchoring member (not illustrated) at its free end. These anchoring members are intended for cooperation with slots 53 in the rear bar 61 of the frame F.

OPERATION

With a cow lying prone on the ground belly strap 56 is positioned beneath the cow just in the rear of her front legs. Belly strap 57 is similarly positioned just in front of her hind legs. This positioning of the belly straps may be achieved either before or after the mobile frame M is moved over the cow as will now be described.

Lower cross bar 29 of the rear end structure is removed from mobile frame M by simply lifting its ends 31 from sockets 30. Frame M is now backed over the cow to assume a position in which hooks 50 and 52 are over belly straps 56 and 57. The ends of each of the latter are now brought into close proximity whereupon hook 50 is inserted in the loops 58 at the ends of strap 57 and hook 52 into loops 58 at the ends of strap 56. Winches 45 and 46 are now operated by their respective handles to raise the cow to an erect position.

Frame F is now placed beneath the cow and secured in an upraised position by anchoring the lower ends of chains 55 to anchor tabs 70. Hooks 52 is now withdrawn from the loops 58 to which it was attached and engaged with loop 62 on front bar 60 of frame F. Hook 50 is withdrawn from the loops 58 and engaged with either loop 69 on rear bar 61 or chain 70 and winches 45 and 46 operated to raise frame F to the extent necessary to impart a comfortable poition to the cow. In this position intermediate straps 64 and 65 are slack so that the cow is able to walk. However, should she falter they will supplement front strap 63 and rear strap 65 in preventing the cow from falling.

Breast harness B is now applied to the cow with head portion 72 positioned in front of the cow just below her neck and top strap 73 over the top of the cow just behind the neck. The bar 29 is now replaced and the ends of chains 74 anchored to slots 53 in bar 61. Hitch 19 is swung upwardly and pin 23 inserted in socket 24 to maintain the upraised position.

The cow can now walk about, pulling mobile frame M with her. She can make turns because the wheel 18 is pivoted. When she has regained her ability to stand erect and walk the mobile frame M is removed and drawn to a desired site over another cow by hitch 19.

While a preferred specific embodiment of the invention as hereinbefore set forth, it is to be clearly understood that the invention is not to be limited to the exact constructions, mechanisms and devices illustrated and described, because various modifications of these details may be provided in putting the invention into practice.

Wht is claimed is:

1. An apparatus for assisting a cow in walking, the combination of:
   (a) a frame including a pair of winches, said frame having means at its bottom for providing ground mobility,
   (b) a cable taken up on each winch and having a hook on its free end,
   (c) a pair of belly straps adapted to be positioned beneath the belly of a cow in a prone position with a loop at each end of each strap, said straps being wrappable about a cow whereby the loops on each strap assume a position in close proximity to each other whereby they may be engaged by one of said hooks,
   (d) a stretcher frame including a plurality of straps adapted to assume positions beneath the cow's body.
   (e) means for supporting the stretcher frame from said first mentioned frame, (f) means on said stretcher frame engageable by said hooks after they are removed from the loops on the belly straps, and (g) a breast harness including a breast strap, a top strap and means for detachably connecting the breast harness to said first mentioned frame.

2. The apparatus of claim 1 in which said means for providing ground mobility includes a pair of rear wheels and a pivoted front wheel.

3. The apparatus of claim 2 in which the front wheel is pivoted in a vertical column, together with a hitch connected to said column.

4. The apparatus of claim 1 in which said first mentioned frame includes a rear bar that is removable to enable the frame to be moved over a cow in a prone position.

5. The apparatus of claim 4 in which the breast harness is detachably secured to said stretcher frame at the rear thereof.

6. The apparatus of claim 1 in which the means for supporting the stretcher frame from the first mentioned frame takes the form of chains having their upper ends anchored to upper portion of the first mentioned frame and their lower ends detachably secured to the stretcher frame.

7. The apparatus of claim 1 in which the stretcher frame includes a longitudinal center strap adapted to assume a position beneath a cow's body and between her legs.

8. The apparatus of claim 7 in which the stretcher frame also includes four cross straps, one being designed for positioning in front of cow's forelegs, two between the fore and hind legs of the cow, and the other behind the rear legs of the cow.

9. The apparatus of claim 1 in which each cable extends from the winch on which it is wound, upwardly and over a pulley supported by upper structure of the first mentioned frame, and towards the central portion of the first mentioned frame where it passes over a second pulley.

10. The apparatus of claim 4 in which the first mentioned frame includes a pair of lower side beams that are located below the level of said rear bar.

References Cited

UNITED STATES PATENTS

| | | | |
|---|---|---|---|
| 877,947 | 2/1908 | Pendleton | 119—100 |
| 1,277,052 | 8/1918 | Dunn | 119—102 |
| 2,327,671 | 8/1943 | Rupprecht | 272—70.3 |
| 3,252,704 | 5/1966 | Wilson | 272—70.3 |

FOREIGN PATENTS

| | | | |
|---|---|---|---|
| 321,594 | 9/1902 | France | 119—102 |
| 91,725 | 11/1921 | Switzerland | 119—102 |

ALDRICH F. MEDBERRY, Primary Examiner

U.S. Cl. X.R.

17—1; 119—103; 128—25; 272—70.3